(12) United States Patent
Wu

(10) Patent No.: US 9,122,029 B2
(45) Date of Patent: Sep. 1, 2015

(54) OPTICAL CONNECTOR PACKAGE AND OPTICAL CONNECTOR

(75) Inventor: Kai-Wen Wu, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 395 days.

(21) Appl. No.: 13/555,173

(22) Filed: Jul. 22, 2012

(65) Prior Publication Data

US 2013/0259432 A1    Oct. 3, 2013

(30) Foreign Application Priority Data

Mar. 28, 2012    (TW) .............. 101110703 A

(51) Int. Cl.
G02B 6/255    (2006.01)
G02B 6/42    (2006.01)

(52) U.S. Cl.
CPC ............ *G02B 6/4246* (2013.01); *G02B 6/4268* (2013.01); *G02B 6/4274* (2013.01)

(58) Field of Classification Search
None
See application file for complete search history.

(56) References Cited

U.S. PATENT DOCUMENTS 5,195,154 A * 3/1993 Uchida ........................... 385/88
6,071,017 A * 6/2000 Gilliland et al. ................ 385/93
6,671,449 B1 * 12/2003 Yuan et al. .................... 385/135

* cited by examiner

*Primary Examiner* — Jerry Rahll
*Assistant Examiner* — Hoang Tran
(74) *Attorney, Agent, or Firm* — Novak Druce Connolly Bove + Quigg LLP

(57) ABSTRACT

An optical connector package includes a substrate and a casing positioned on the substrate and comprising a positioning pin. The casing and the substrate cooperatively define a receiving space. The positioning pin defines a vent functioning as a sole channel communicating the receiving space with the outside of the casing. The vent is sealed after the optical connector package subjects to all required heating processes.

8 Claims, 2 Drawing Sheets

OPTICAL CONNECTOR PACKAGE AND OPTICAL CONNECTOR

BACKGROUND

1. Technical Field

The present disclosure relates to optical connectors and, particularly, to an optical connector package and an optical connector.

2. Description of Related Art

Optical connectors include an optical connector package and an outer casing. The optical connector package includes a substrate, a laser diode, a photo detector, and a casing. The laser diode and the photo detector are positioned on and electrically connected to the substrate. The casing includes a top plate and a sidewall extending downward from a periphery of the top plate. The top plate forms two lenses and the sidewall forms two positioning pins. The casing is positioned on the substrate. The laser diode and the photo detector are packaged and thus protected in a sealed space formed between the substrate, the sidewall, and the top plate, and align with the respective lenses for emitting and receiving light via the respective lenses. The positioning pins engage with the outer casing and thus position the optical connector package in the outer casing. However, in assembling, the optical connector may subject to a heating process and thus a pressure in the sealed space may increase past an endurable range of the laser diode and/or the photo detector and may damage the laser diode and/or the photo detector.

Therefore, it is desirable to provide an optical connector package and an optical connector, which can overcome the above-mentioned shortcomings.

DETAILED DESCRIPTION

Embodiments of the disclosure will be described in detail, with reference to the accompanying drawings.

Figure 1:
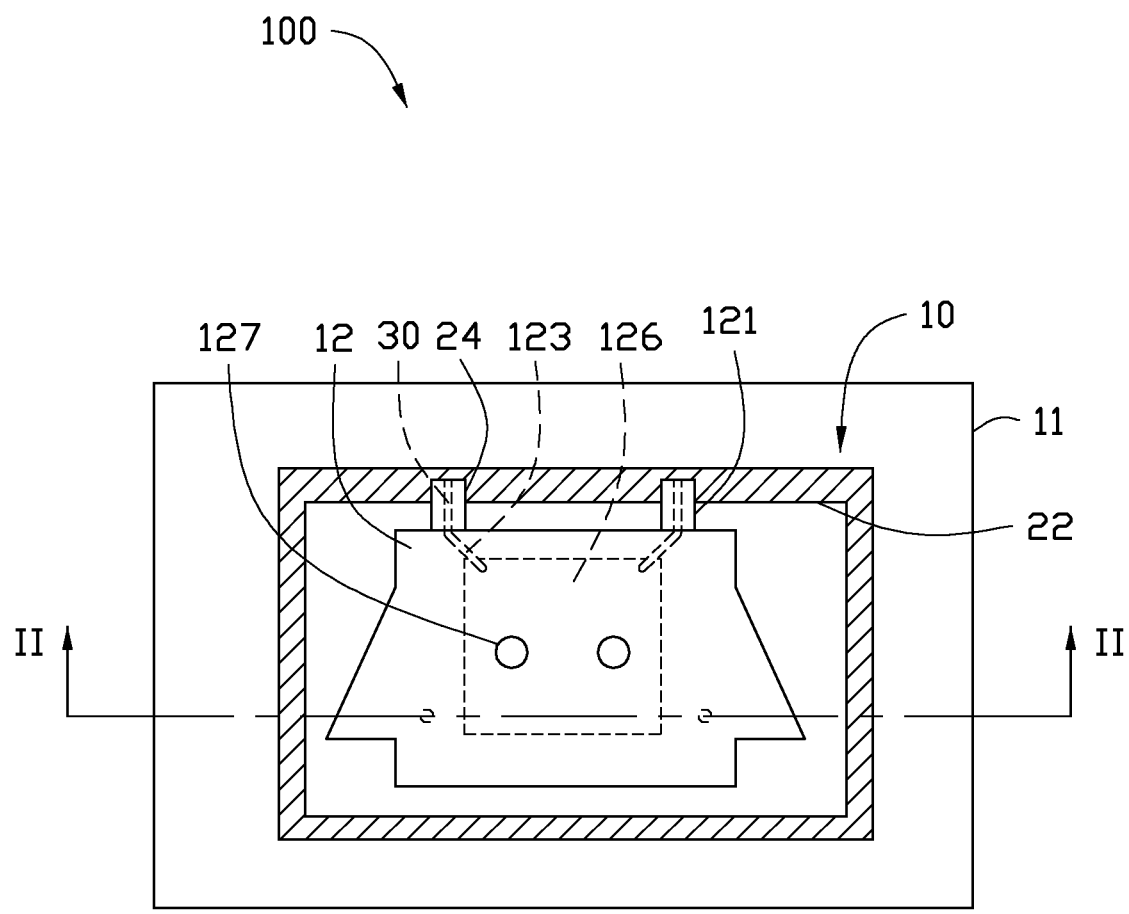
FIG. 1 is a schematic top view of an optical connector with a top of an outer casing of the optical connector removed, according to an embodiment.
Figure 2:
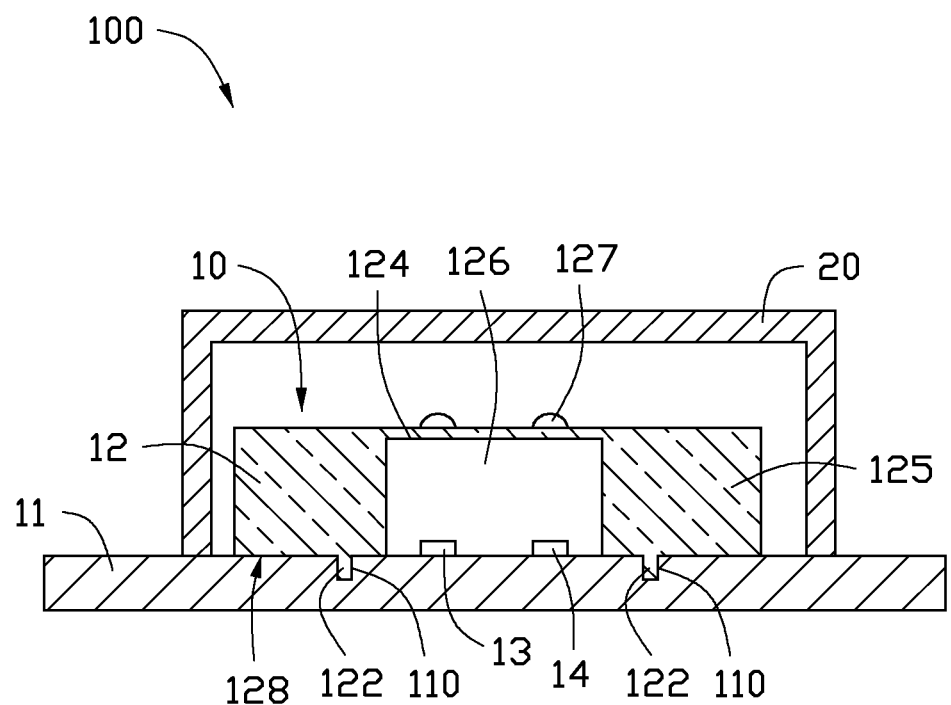
FIG. 2 is a cross-sectional schematic view of the optical connector, taken along a line II-II of FIG. 1.

Referring to FIGS. 1 and 2, an optical connector 100, according to an embodiment, includes an optical connector package 10 and an outer casing 20.

The optical connector package 10 includes a substrate 11, a casing 12, a laser diode 13, and a photo detector 14.

The substrate 11 is a printed circuit board and may forms various circuits (not shown), for example, driving circuits for the laser diode 13 and photoelectric converting circuits for the photo detector 14. The substrate 11 also defines two locating holes 110 therein.

The casing 12 includes a top plate 124 and a sidewall 125 extending downward from a periphery of the top plate 124. The top plate 124 and the sidewall 125 cooperatively define a receiving space 126 therebetween. The top plate 124 forms two lenses 127 and the sidewall 125 forms two positioning pins 121 protruding outwards. Each of the positioning pins 121 defines a vent 123 extending therethrough and thus communicates the receiving space 126 with the outside of the casing 12. The sidewall 125 includes a bottom surface 128 opposite to the top plate 125 and forms two locating pins 122 protruding downwards and corresponding to the locating holes 110.

The outer casing 20 includes an inner surface 22 and defines two positioning blind holes 24 in the inner surface 22, corresponding to the positioning pins 121.

In assembly, the laser diode 13 and the photo detector 14 are positioned on and electrically connected to the substrate 11. The casing 12 is placed on the substrate 11, the bottom surface 128 contacts the substrate 11, and the locating pins 122 insert into the respective locating holes 11. The laser diode 13 and the photo detector 14 are received in the receiving space 126 and align with the respective lenses 127 for emitting and receiving light via the respective lenses 127. The casing 12 is fixed to the substrate 11 by, for example, glue. Thus, the laser diode 13 and the photo detector 14 are packaged and protected within the receiving space 1226. When the optical connector package 10 subjects to any required heating process, hot air can escape from the receiving space 126 via the vents 123. As such, a pressure in the receiving space 126 can be remained within an endurable range of the laser diode 13 and/or the photo detector 14.

After the optical connector package 10 passes all the required heating processes, the vents 127 can be sealed by available sealants 30 filled therein to seal the receiving space 120.

In the embodiment, the optical connector package 10 is received in the outer casing 20 with the positioning pins 121 inserting into the respective positioning blind holes 24. Thus, after all the required heating processes, the vents 127 are also sealed by the outer casing 20. In other embodiment, the vents 127 can be sealed only by the sealants 30 or the outer casing 20.

In other embodiments, only one positioning pin and one positioning blind hole can be employed. Also, more than two positioning pins and positioning blind holes can also be employed depending on requirements.

The numbers of the locating pins and the locating holes are not limited to this embodiment, but can be set depending on requirements.

Particular embodiments are shown here and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical connector package, comprising: a substrate; and a casing positioned on the substrate and comprising a positioning pin, the casing and the substrate cooperatively defining a receiving space, the positioning pin defining a vent by itself functioning as a sole channel communicating the receiving space with the outside of the casing; wherein the casing comprises a top plate and a sidewall directly extending downward from a periphery of the top plate, the positioning pin protrudes outside from the sidewall, the sidewall comprises a bottom surface opposite to the top plate and comprises two locating pins extending downward from the bottom surface, the substrate defines two locating holes corresponding to the locating pins, and the casing is located on the substrate by inserting the locating pins into the respective locating holes.

2. The optical connector package of claim 1, comprising a laser diode and a photo detector, the laser diode and the photo detector being positioned on and electrically connected to the substrate and packaged within the receiving space.

3. The optical connector package of claim 2, wherein the top plate forms two lenses, the laser diode aligns with and emits light via one of the lenses, and the photo detector aligns with and receives light via the other lens.

4. The optical connector package of claim 1, wherein the vent is sealed by a sealant filled therein.

5. An optical connector, comprising: an optical connector package, comprising: a substrate; and a casing positioned on the substrate and comprising a positioning pin, the casing and the substrate cooperatively defining a receiving space, the positioning pin defining a vent by itself functioning as a sole channel communicating the receiving space with the outside of the casing; and an outer casing housing the optical connector package; wherein the casing comprises a top plate and a sidewall directly extending downward from a periphery of the top plate, the positioning pin protrudes outside from the sidewall, the sidewall comprises a bottom surface opposite to the top plate and comprise two locating pins extending downward from the bottom surface, the substrate defines two locating holes corresponding to the locating pins, and the casing located on the substrate by inserting the locating pins into the respective locating holes; wherein the outer casing comprises an inner surface and defines a positioning blind hole on the inner surface, and the optical connector package is positioned in the outer casing and vent is sealed by inserting the positioning pin into the positioning blind hole.

6. The optical connector of claim 5, further comprising a laser diode and a photo detector, the laser diode and the photo detector being positioned on and electrically connected to the substrate and packaged within the receiving space.

7. The optical connector of claim 6, wherein the top plate forms two lenses, the laser diode aligns with and emits light via one of the lenses, and the photo detector aligns with and receives light via the other lens.

8. The optical connector of claim 5, wherein the vent is sealed by a sealant filled therein.

\* \* \* \* \*